United States Patent
Willins (10) Patent No.: US 9,519,353 B2
(45) Date of Patent: Dec. 13, 2016

(54) COMBINED SPEECH AND TOUCH INPUT FOR OBSERVATION SYMBOL MAPPINGS

(75) Inventor: Bruce Willins, E Northport, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 743 days.

(21) Appl. No.: 12/413,683

(22) Filed: Mar. 30, 2009

(65) Prior Publication Data

US 2010/0250248 A1    Sep. 30, 2010

(51) Int. Cl.

| | | |
|---|---|---|
| *G06F 3/023* | (2006.01) | |
| *G10L 15/28* | (2013.01) | |
| *G06F 3/0488* | (2013.01) | |
| *G10L 15/26* | (2006.01) | |
| *H04M 1/27* | (2006.01) | |

(52) U.S. Cl.
CPC ......... *G06F 3/0237* (2013.01); *G06F 3/04886* (2013.01); *G10L 15/26* (2013.01); *H04M 1/271* (2013.01); *H04M 2250/74* (2013.01)

(58) Field of Classification Search
CPC .... G06F 3/0237; G06F 3/04886; G10L 15/26; H04M 2250/74
USPC ............................................ 704/3, 256, 270
See application file for complete search history.

(56) References Cited

U.S. PATENT DOCUMENTS

| | | | | |
|---|---|---|---|---|
| 5,855,000 | A * | 12/1998 | Waibel et al. ................ | 704/235 |
| 7,088,345 | B2 * | 8/2006 | Robinson et al. ............ | 345/173 |
| 7,467,089 | B2 * | 12/2008 | Roth et al. .................... | 704/270 |
| 7,844,914 | B2 * | 11/2010 | Andre et al. .................. | 715/773 |
| 7,881,936 | B2 * | 2/2011 | Longe ................ | G06K 9/00422 |
| | | | | 704/257 |
| 7,886,233 | B2 * | 2/2011 | Rainisto et al. .............. | 715/773 |
| 7,941,316 | B2 * | 5/2011 | Mahajan et al. .............. | 704/235 |
| 7,970,612 | B2 * | 6/2011 | Han ....................... | G06F 3/0233 |
| | | | | 704/231 |
| 8,095,364 | B2 * | 1/2012 | Longe ..................... | G10L 15/24 |
| | | | | 704/235 |
| 2005/0131687 | A1 * | 6/2005 | Sorrentino ............. | G10L 15/28 |
| | | | | 704/235 |
| 2005/0240406 | A1 * | 10/2005 | Carroll .......................... | 704/235 |
| 2005/0283364 | A1 * | 12/2005 | Longe et al. ................. | 704/257 |

(Continued)

FOREIGN PATENT DOCUMENTS

| | | |
|---|---|---|
| CN | 101082836 A | 12/2007 |
| WO | 00/742440 A1 | 12/2000 |

OTHER PUBLICATIONS

International Preliminary Report on Patentability and Written Opinion for counterpart International Patent Application No. PCT/US20101027389 issued on Oct. 4, 2011.*

(Continued)

*Primary Examiner* — Jialong He (57) ABSTRACT

The invention relates to systems and or methodologies for enabling combined speech and touch inputs for observation symbol mappings. More particularly, the current innovation leverages the commonality of touch screen display text entry and speech recognition based text entry to increase the speed and accuracy of text entry via mobile devices. Touch screen devices often contain small and closely grouped keypads that can make it difficult for a user to press the intended character, by combining touch screen based text entry with speech recognition based text entry the aforementioned limitation can be overcome efficiently and conveniently.

16 Claims, 10 Drawing Sheets

(56) References Cited

U.S. PATENT DOCUMENTS

| | | | |
|---|---|---|---|
| 2006/0190256 A1* | 8/2006 | Stephanick et al. | 704/252 |
| 2008/0120102 A1* | 5/2008 | Rao | G10L 15/22 |
| | | | 704/235 |
| 2008/0235029 A1* | 9/2008 | Cross | G10L 15/22 |
| | | | 704/275 |
| 2008/0282154 A1 | 11/2008 | Nurmi | |
| 2009/0055174 A1* | 2/2009 | Han et al. | 704/235 |
| 2010/0031143 A1* | 2/2010 | Rao | G06F 3/0237 |
| | | | 715/261 |
| 2011/0201387 A1* | 8/2011 | Paek | G06F 3/0237 |
| | | | 455/566 |

OTHER PUBLICATIONS

"Viterbi Algorithm", [online], http://www.wikipedia.com, retrieved from www.archive.org, archived on Oct. 22, 2007.*
"Hidden Markov model", [online], http://www.wikipedia.com, retrieved from www.archive.org, archived on Oct. 14, 2007.*
Blunson, "Hidden Markov Model", [online], published on Aug. 19, 2004.*
Jurafsky, "Speech recogntion and syntheis", a lecture note, [online], 2007.*
Newman, "Dragon naturally speaking 6 user's guide", May 2002.*
International Search Report and Written Opinion dated Jul. 16, 2010 in related case PCT/US2010/027389.
International Preliminary Report on Patentability and Written Opinion for counterpart International Patent Application No. PCT/US2010/027389 issued on Oct. 4, 2011.

* cited by examiner

COMBINED SPEECH AND TOUCH INPUT FOR OBSERVATION SYMBOL MAPPINGS

BACKGROUND

Mobile communication and computing technologies have experienced significant growth over the past several years. This growth has lead to mobile computing systems of increased sophistication and complexity. The increased computing power has enabled mobile computing devices to capture information and data via a plurality of techniques. Mobile communication devices now more closely resemble computers, than standard telephones, and include everything from cameras to sophisticated operating systems.

Virtual keypads using touch screen displays are becoming increasingly popular on small handheld mobile devices. Such touch screens are often used for text entry, however, accurate text entry is difficult due to their small size and a user's inability to tap precise character locations on the screen. At the same time, this class of small handheld mobile devices often incorporate audio capabilities for telephony and basic automatic speech recognition (ASR) for phone dialing. Generally, such devices are not capable of high quality, large vocabulary, speech to text, and are subject to frequent ASR errors in high noise environments. Furthermore, is prone to frequent errors ASR in noisy environments.

Given the movement to these very small and powerful touch screen devices, users are now trying to input more significant messages. However, entering a lengthy message via a touch screen keypad can be time consuming and error prone. Current solutions include techniques such as spell checking. However, these solutions can be slow and often require user interaction. Consequently, it would be desirable to have a technique that improved both the accuracy and efficiency of text entry for mobile computing devices.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more aspects of the subject innovation, various aspects are described in connection with combined speech and touch input for observation symbol mappings. According to related aspects, a system for mobile device text entry is provided. The system includes a text recognition component that obtains a set of inputs from a text entry component, and produces a set of observations based on the inputs, a voice recognition component that obtains audio data from an audio capture component, and produces a set of observations based on the audio data, and a predictive component that combines the observations from the text recognition component and the voice recognition component into a concatenated observation sequence, and generates a textual output based on the concatenated observation sequence.

Another aspect relates to a method for mobile device text entry. The method includes generating a first set of observations based on user inputs obtained via a first input device, generating a second set of observations based on user inputs obtained via a second input device, combining the first set of observations and the second set of observations to produce a set of combined observations, and producing a textual output based at least in part on the combined observations.

Still another aspect relates to a system for mobile device text entry. The system includes means for generating a first set of observations based on user inputs obtained via a touch screen display that provides a graphical key interface, wherein users select at least one character by pressing the character on the interface, means for generating a second set of observations based on user inputs obtained via an audio capture device, and means for combining the first set of observations and the second set of observations to produce a set of concatenated observations, and means for producing a textual output based on the concatenated observations by using at least one of a Hidden-Markov Model, or a Viterbi decoder.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used.

Figure 1:
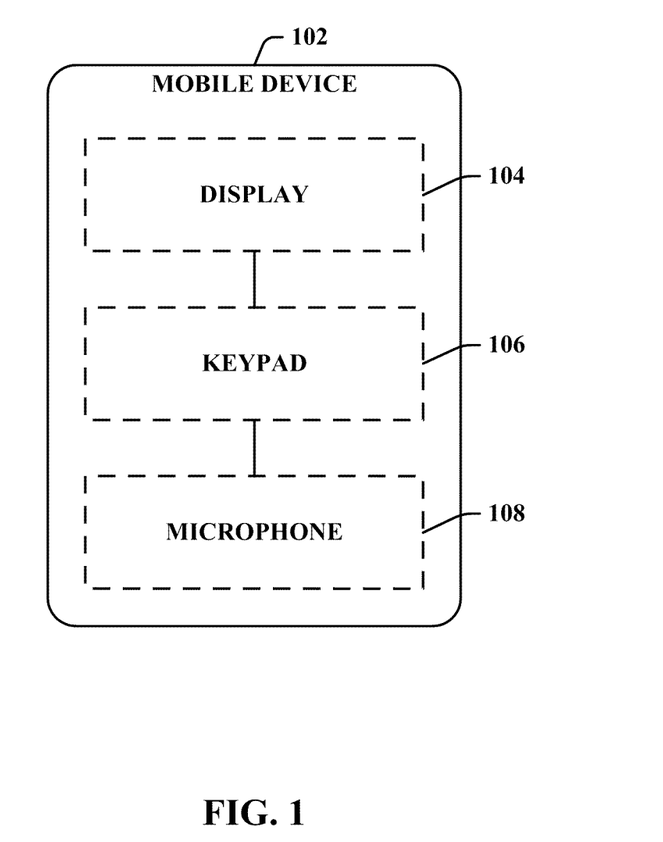
FIG. 1 illustrates an exemplary mobile device in accordance with one or more aspects of the subject specification.

FIG. 1 illustrates an exemplary mobile device in accordance with an aspect of the subject innovation. The mobile device 102 can include but is not limited to cellular phones, smart phones, laptops, handheld communication devices, handheld computing devices, satellite radios, global positioning systems, PDAs, and so forth. The mobile device 102 includes a display 104, a keypad 106, and a microphone (mic) 108. The display can be a liquid crystal diode display (LCD), a plasma display, a video graphics array (VGA), and the like. For example, the display 104 can include a touch screen display that can provide a set of interfaces, and obtain inputs from a user.

In addition, the keypad 106 can be a set of buttons, keys, controls, and so forth that provide for user interaction with the mobile device 102. For instance, the keypad 106 can be a small numeric keypad with a calculator-style arrangement of buttons that allows users to input information, such as a phone number. The keypad 106 can further be a QWERTY style keyboard that allows for alphanumeric entry of information into the mobile device 102. Additionally or alternatively, the keypad 106 can be a graphical display (e.g., key wedge, etc.) provided on the display 104. For instance, where the display 104 includes a touch screen interface (as discussed previously), a keypad 106 can be displayed to facilitate user input.

The microphone 108 can be most any suitable audio input device, and may be coupled with or also act as a speaker (e.g., audio output device) for the propagation of audio data. For example, the microphone 108 can enable a user to record a message, or exploit the mobile device's 102 telephony services. In addition, the microphone 108 can be a coupled with automatic speech recognition (discussed in greater detail below). It is to be appreciated that the mobile device 102 is illustrated for simplicity and brevity of explanation. However, the manner in which the mobile device 102 can be employed to carry out the functions relating to the present innovation will be readily apparent to those having ordinary skill in the art based on the description provided herein.

Figure 2:
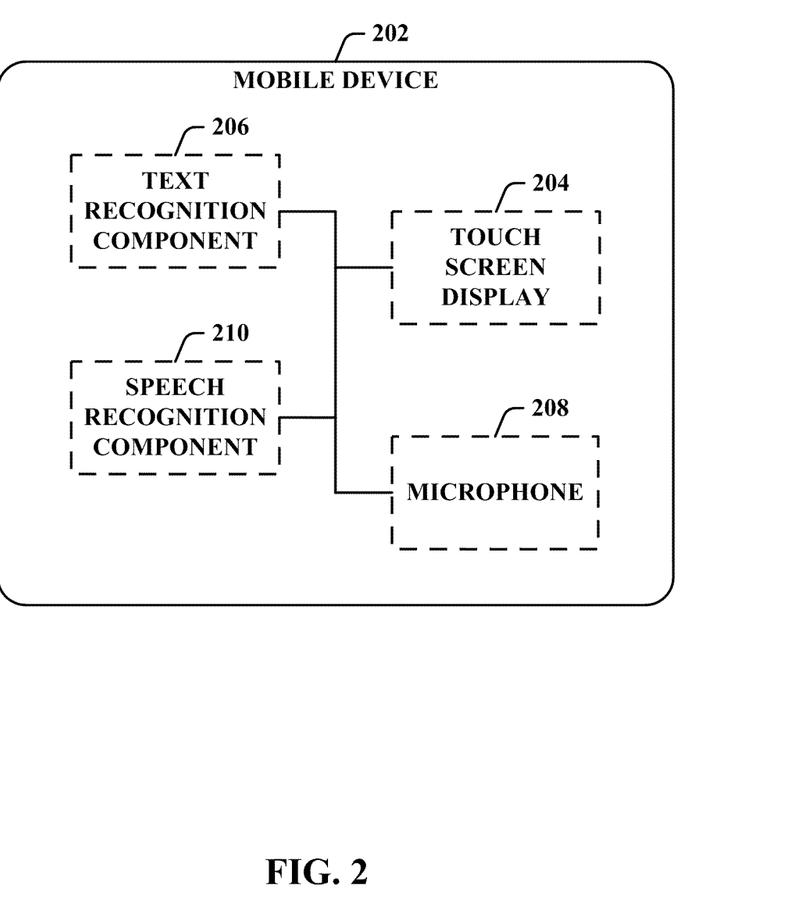
FIG. 2 illustrates an exemplary mobile device in accordance with one or more aspects of the subject specification.

Turning now to FIG. 2, an example mobile device is illustrated in accordance with an aspect of the subject innovation. As discussed previously, the mobile device 202 can be a cellular phone, smart phone, laptop, handheld communication device, handheld computing device, satellite radio, global positioning system, PDA, etc. The mobile device 202 includes a touch screen display 204, a text recognition component 206, a microphone 208, and a speech recognition component 210.

The touch screen display 204 can be most any display suitable for displaying data (e.g., user interfaces, etc.) and accepting inputs from a user via a touch screen interface. For example, the touch screen display 204 can show the user a graphical representation of QWERTY style keyboard, wherein the user can type a message by pressing, contacting or otherwise touching the approximate location of a letter or series of letters on the touch screen display 204 with their finger, a stylus, and the like. The location of each letter on the touch screen display 204 can be expressed in terms of an X-Y location (e.g., X-Y coordinates).

The text recognition component 206 can determine the X-Y location of a user's contact on the touch screen display 204. For instance, the center of the letter Q may reside at the X-Y location (0, 0), wherein if the user presses approximately (0, 0) within some predetermined threshold (e.g., 10) the text recognition component 206 determines that the user intended to press Q. In addition, the text recognition component 206 can provide possible intended user inputs. For example, if the text recognition component 206 determines that the first letter was a Q, and the next press by user was within the X-Y location of the letter Y, then the text recognition component 206 can determine that the user may have in fact intended to press the letter U. The text recognition component 206 can make such a determination based on the proximity of the letter U to the letter Y on a QWERTY style keypad, and the probabilities of the letters Y or U following the letter Q.

The microphone 208 can include most any suitable audio input device that allows a user to input audio data (e.g., speak, etc.) into the mobile device 202. The microphone 208 can be used in conjunction with the mobile device's 202 telephony services, record voice messages, or derive text entries from speech. The speech recognition component 210 derives feature sets (e.g., energy, spectrum, etc.) from the audio data captured via the microphone 208, and attempts to map the feature sets into words and/or components of words (e.g., phonemes). For example, the user can say a short phrase into the microphone 208, wherein the speech recognition component will sample the short phrase and map it into words to create a text entry.

Typically, a mobile device 202 user has the option of text entry via the touch screen display 204 or the microphone 208. Text entry via a touch screen display 204 can be arduous and time consuming. In particular, the keys on touch screens display are often necessarily close together, which can make pressing an intended key difficult to accomplish. In addition, text entry via a microphone 208 can be very susceptible to surrounding noise, and nuisances of common speech. However, by combining these techniques, the current innovation can leverage their strengths to produce a more efficient and convenient technique for text entry (discussed in greater detail below).

Figure 3:
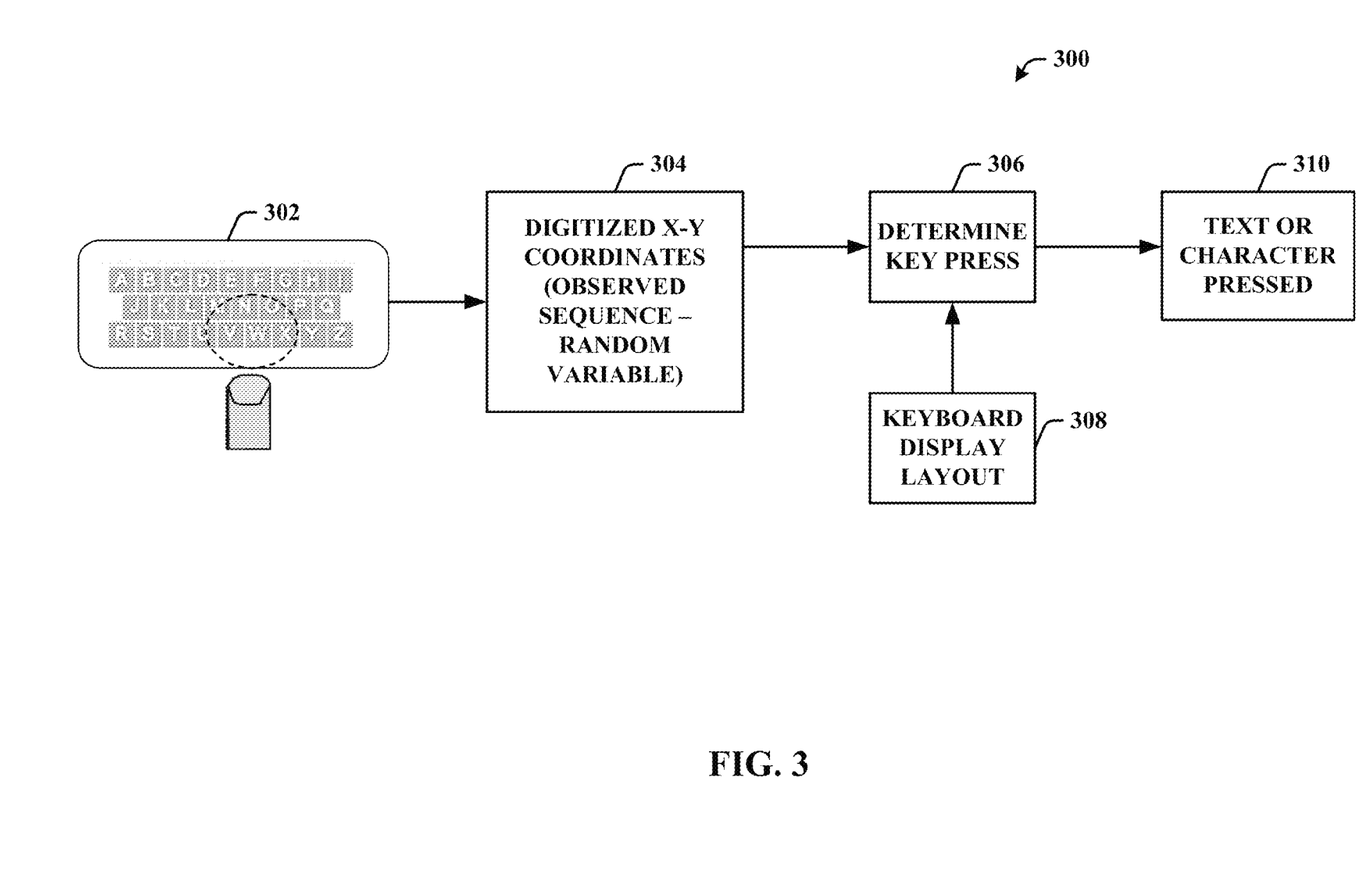
FIG. 3 illustrates an example block diagram of text entry via a touch screen display in accordance with an aspect of the subject specification.

FIG. 3 is an example block diagram illustrating text entry via a touch screen display in accordance with one or more aspects of the subject innovation. At 302, a touch screen keypad is illustrated as having a plurality of characters (e.g., 26) located at various predetermined X-Y locations (e.g., X-Y coordinates). For example, the center of the character "W" can reside at the location (50, 0) in the illustration. A user can select the "W" by pressing, contacting or otherwise touching the approximate location of the character on the touch screen display using their finger, a stylus, and so forth.

At 304, the digitized X-Y coordinates of a user selection are obtained, captured, or otherwise observed. For example, a user desiring to enter the character W attempts to press as close to the center of the W (e.g., 50, 0) as possible. As long as the user presses within a predetermined threshold around the center of the character, then it can be easily recognized as the intended character. The predetermined threshold can be, for example, the size of the graphical representation (e.g., area) of the character on the touch screen display.

At 306, a key press is determined based on the digitized coordinates. A keyboard display layout 308 can be used to map the digitized coordinates to a character. Returning to the previous example, if the digitized coordinates of the key press are (51, 1), then using the keyboard display layout 308 the key press can be determined to be the character "W". At 310, the text or character pressed can be displayed and/or used by an application or process operating on the mobile device.

However, coordinates within the area of a character are not always indicative of the character the user intended to select. For example, many touch screen devices have relatively small displays, and as a consequence, the characters can be small and/or grouped close together. Therefore, a user intending to press a first character may inadvertently press a second neighboring character, and due to the size and grouping of the characters, the coordinates may be well within the area of the second character.

Figure 4:
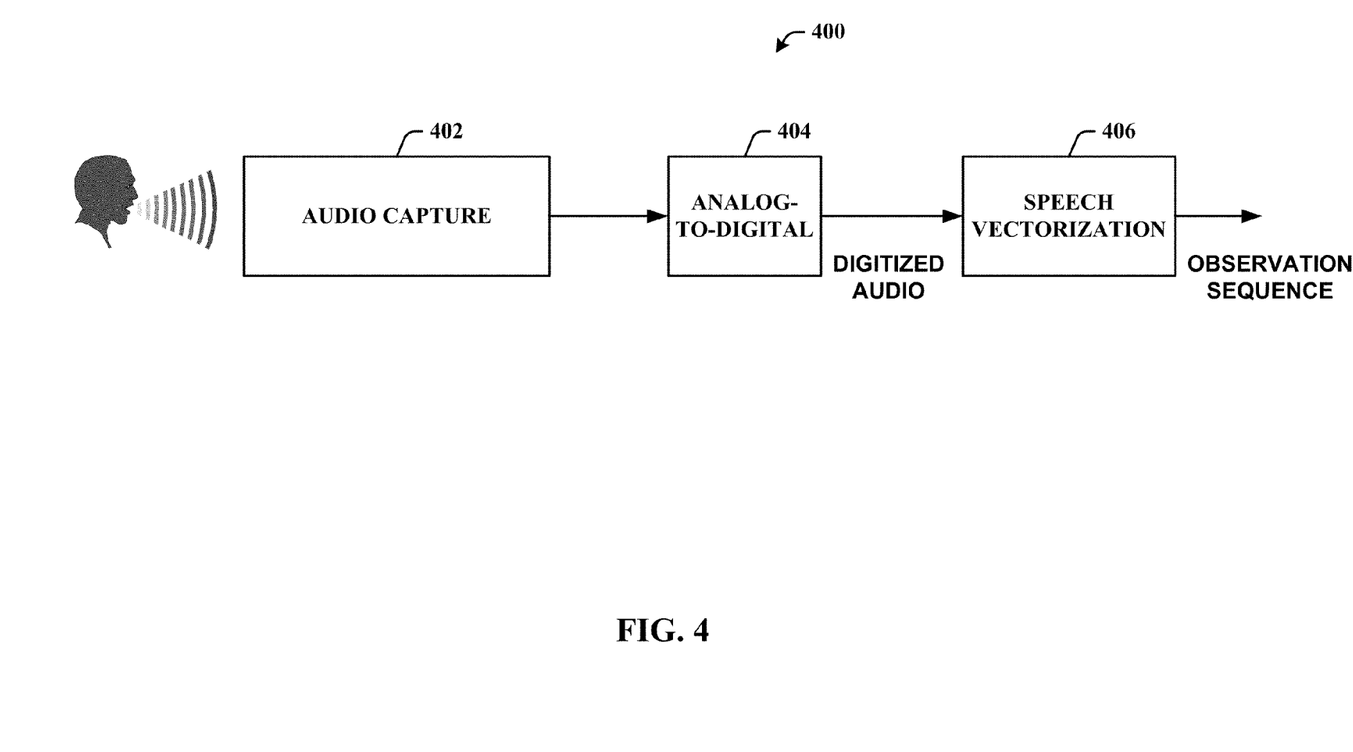
FIG. 4 is an example block diagram illustrating text entries derived from speech in accordance with an aspect of the subject innovation specification.

FIG. 4 is an example block diagram illustrating text entries derived from speech in accordance with one or more aspects of the subject innovation. At 402, speech is captured, acquired, or otherwise obtained from one or more users via an audio capture device. For example, the audio capture device can be comprised of a microphone and amplifier, wherein the user speaks into the microphone. The user can say a command, a word, a sound (e.g., laugh, scream, etc.), and so forth, which can be captured (e.g., recorded, sampled, etc.). At 404, the captured audio is transformed from its initial analog state to a digital state. For example, the transformation can be accomplished via an Analog-to-digital converter, which is well known in the art.

At 406, the digitized audio undergoes speech vectorization. Unlike text entry via a touch screen (discussed supra), speech recognition operates by analyzing feature sets (e.g., energy, speech, vectors, etc.) produced from the sampled digital audio, and attempts to map such features into words or components of words. For example, the digitized audio can be mapped to corresponding phonemes, where a phoneme is the smallest posited linguistically distinctive unit of sound.

As illustrated in FIGS. 3 and 4, both touch screen based and speech based text entry both produce a set of temporal observation sequences. These observation sequences represent with some probability a state or sequence of states. Due to the nature of speech and text input, state transitions to other states occur with some finite probability (e.g., transition matrix). Ultimately, both touch screen based and speech based text entry map (e.g., transform) the hypothesized states/transitions into text (e.g., words, components of words, etc.).

Figure 5:
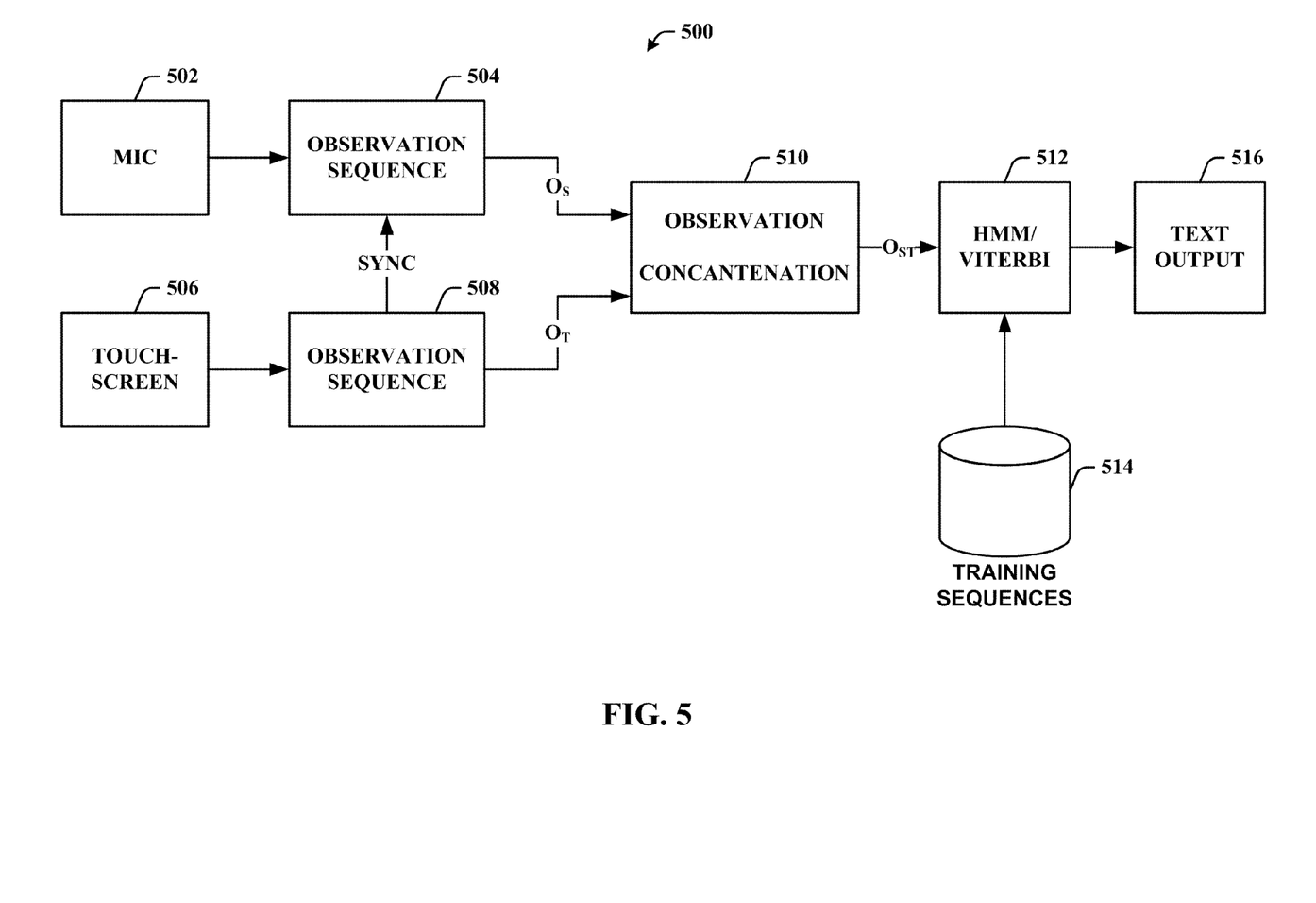
FIG. 5 is a block diagram illustrating a technique that leverages the commonality of touch screen based and speech based text entry in accordance with an aspect of the subject specification.

Referring now to FIG. 5, a block diagram illustrating a technique that leverages the commonality of touch screen based and speech based text entry is shown in accordance with an aspect of the current innovation. At 502, speech is captured, acquired, or otherwise obtained via an audio capture device, such as a microphone (e.g., mic). As discussed previously, a temporal observation sequence, $O_S$, can be produced based on the captured audio (see FIG. 4).

At 506, digitized X-Y coordinates of a user selection on a touch screen are obtained, captured, or otherwise observed. For example, the touch screen can display a plurality of characters located at various predetermined X-Y locations (e.g., X-Y coordinates), wherein a user can select a character by pressing, contacting or otherwise touching the approximate location of the character on the touch screen display using a finger, a stylus, and so forth (see FIG. 3). At 508, the digitized coordinates can be used to provide a temporal observation sequence, $O_T$, as discussed supra.

In both cases, 504 and 508, there is a set of statistical probabilistic observations from which a computing device is attempting to determine text which the user is trying to enter. At 510, the observation sequences for both the speech entry, $O_S$, and text entry, $O_T$, are concatenated to improve the accuracy of the determination. For instance, it is common practice to apply Hidden-Markov Models (HMM) to automatic speech recognition (ASR). HMMs are doubly stochastic, in that, observation symbol(s) are a statistical/probabilistic observable indication of a state and the state-to-state transitions have some associated probabilistic models (e.g., state transition matrix). By combining the observation sequences of both the touch screen and speech, the accuracy of the statistical mapping of observation symbols to a specific state in an HMM-ASR model can be increased. As illustrated, the observation sequences 504 and 508 can be synchronized to facilitate the concatenation.

At 512, the determination of the states and the final text is performed. For instance, the determination of the states and the final text can be accomplished via a HMM, a maximum likelihood Viterbi decoding algorithm, and so forth. In addition, a set of training sequences 514 can be used to facilitate the determination. At 516, the final text is output. For example, the text can be displayed on the touch screen interface and/or utilized by another application or process executing on the device.

Figure 6:
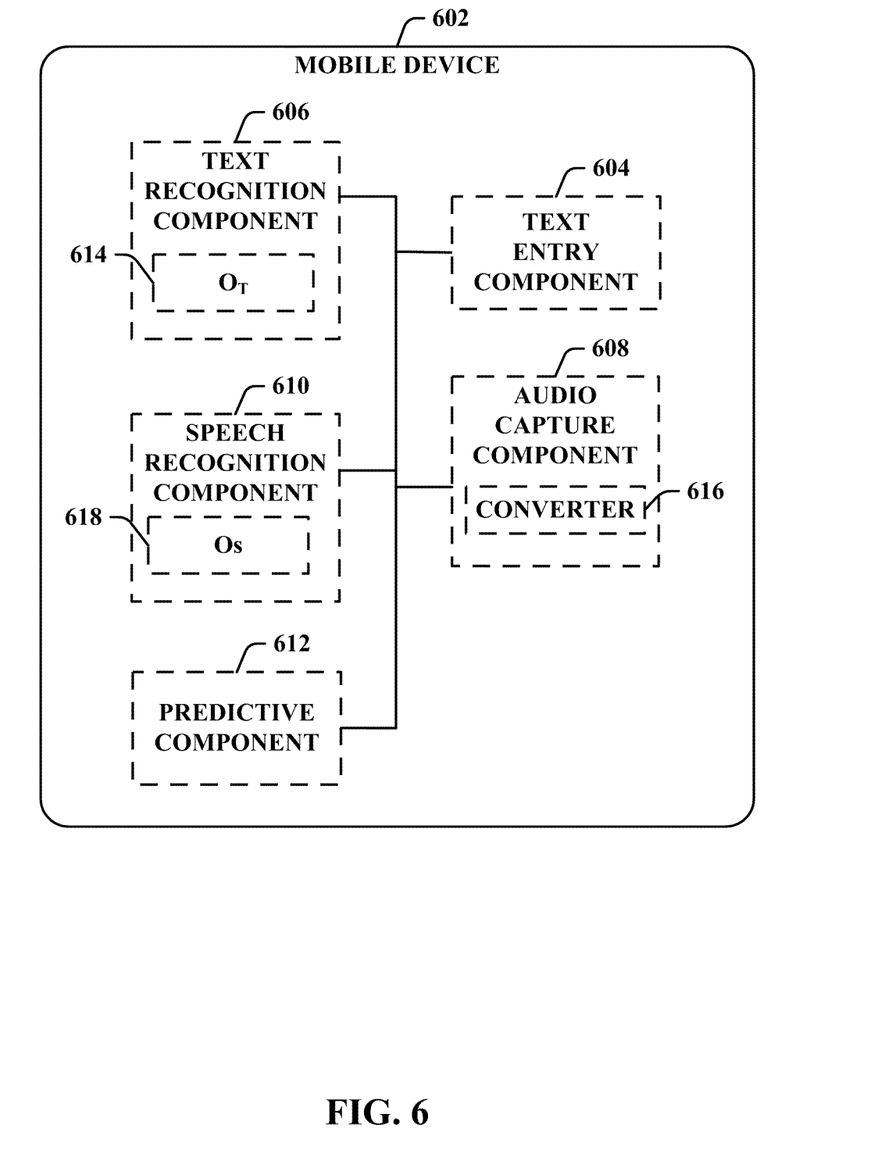
FIG. 6 illustrates an example system for combining speech and touch inputs for observation symbol mappings in accordance with an aspect of the subject specification.

FIG. 6 illustrates an example system for combining speech and touch inputs for observation symbol mappings in accordance with an embodiment of the subject innovation. The system 600 includes a mobile device 602 having a text entry component 604, a text recognition component 606, an audio capture component 608, a speech recognition component 610, and a predictive component 612. As discussed previously, the mobile device 602 can include but is not limited to cellular phones, smart phones, laptops, handheld communication devices, handheld computing devices, satellite radios, global positioning systems, PDAs, and so forth.

The text entry component 604 enables a user to enter text, characters, and the like into the mobile device 602. The text entry component 604 can include a touch screen display, a keypad, a keyboard, and so forth. For example, the text entry component 604 can be a touch screen display that provides a graphical key wedge (e.g., virtual keyboard) having a plurality of characters located at various predetermined X-Y locations (e.g., X-Y coordinates). A user can select one or more of the characters by pressing, contacting or otherwise touching the approximate location of the characters on the touch screen display using their finger, a stylus, and so forth.

Additionally, the text recognition component 606 can obtain, observe, or otherwise determine a set of digitized X-Y coordinates for a user selection. For example, a user desiring to enter a particular character attempts to press as close to the center of the character (e.g., X, Y) as possible. The text recognition component 606 can generate a set of temporal observation sequences 614 (e.g. $O_T$) based on the digitized X-Y coordinates.

User speech can be captured, acquired, or otherwise obtained from one or more users via the audio capture component 608. For example, the audio capture device can be comprised of a microphone and amplifier, wherein the user speaks into the microphone. The user can say a command, a word, a sound (e.g., laugh, scream, etc.), and so forth, which can be captured (e.g., recorded, sampled, etc.). The captured audio can be transformed from its initial analog state to a digital state via an analog-to-digital converter 616 (e.g., converter).

The speech recognition component 610 analyzes feature sets of the digital audio, such as energy, spectrum, speech vectors, and so forth. For example, the digitized audio can be mapped to words, and/or components of words, such as corresponding phonemes (discussed previously). Based on the speech vectorization a temporal observation sequence, $O_S$, can be produced.

Both the text recognition component 606 and the speech recognition component 610 produce a set of statistical, probabilistic observations from which the mobile device 602 is attempting to determine text the user is attempting to enter. The predictive component 612 concatenates the observation sequences from both the text recognition component 606 (e.g., $O_T$ 614), and the speech recognition component 610 (e.g., $O_S$ 618) to improve the accuracy of the determination. By combining the observation of both sequences, the accuracy of the statistical mapping of observation symbols to a specific state can be increased. For instance, the predictive component 612 can include a Hidden-Markov model (HMM) and/or a maximum likelihood Viterbi decoding algorithm that maps the observations to a specific state.

Figure 7:
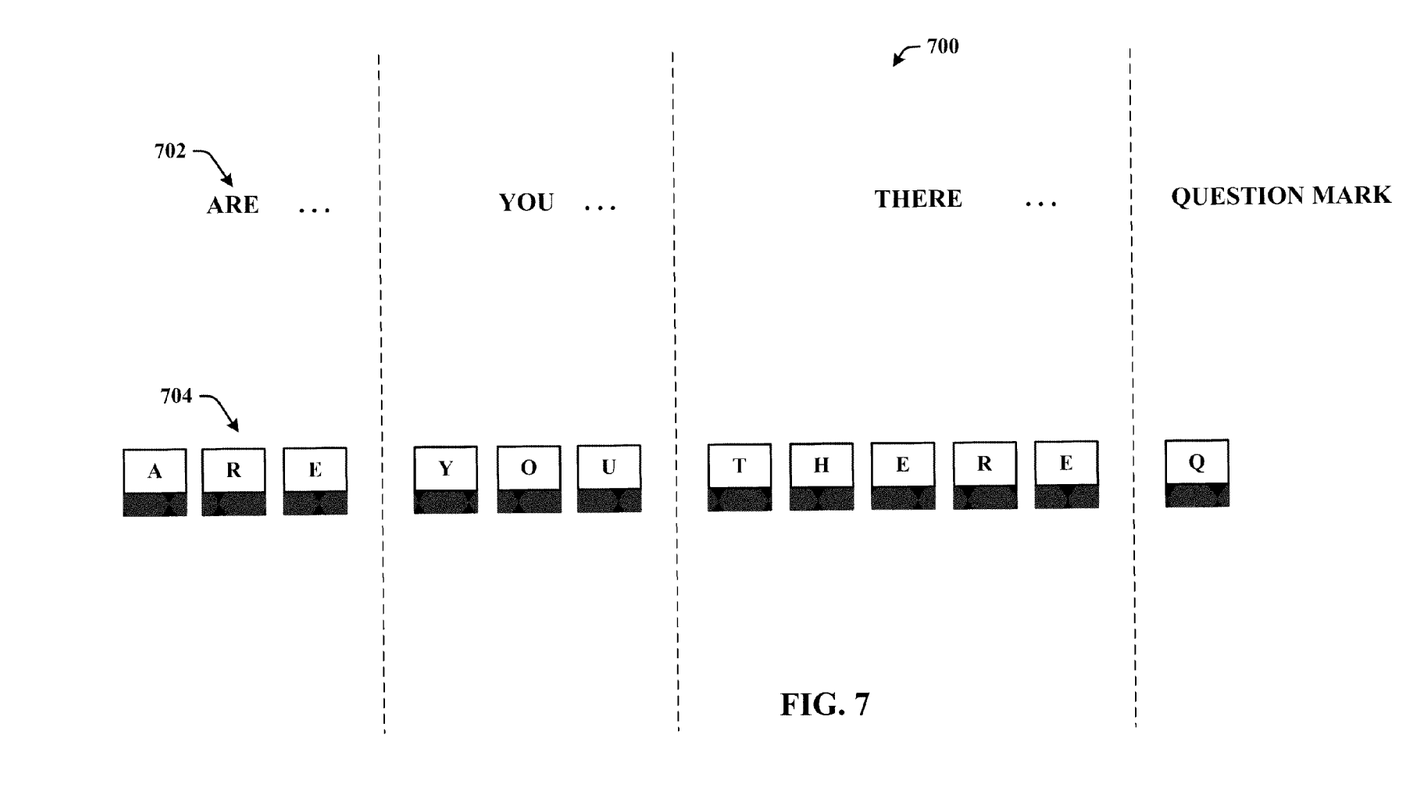
FIG. 7 illustrates an example speech entry sequence and text entry sequence in accordance with an aspect of the subject specification.

In operation, the user can enter text via the text entry component 604 (e.g., type) and speak relatively concurrently. The effect is to facilitate faster touch entry as the user becomes less concerned with locating the exact position (e.g., X-Y location) of the character. Thus, text entry via the text entry component 604 becomes less arduous, and becomes more of a proximity typing modality. In addition, the system 600 can enable users to enter characters without switching character sets. Turning briefly to FIG. 7, an example speech entry sequence 702, and text entry sequence 704 are illustrated in accordance with an aspect of the current innovation, wherein the user can speak the phrase "are you there question mark", while nearly simultaneously typing "are you there q." Returning to FIG. 6, using the verbal phrase "question mark" combined with the typed letter "q" (or a letter in the close proximity of q"), the predictive component 612 can disambiguate the entry and properly output the text "are you there?" as desired by the user.

In addition, the system 600 can enable a selective hybrid voice/touch system. For example, the user may not speak every word into the audio capture component 608. The user may only vocalize special characters that might not be immediately visible via the text entry component 604, such as characters that require using a particular key (e.g., shift, function, etc.), or require changing the screen displayed to provide the special characters. For example, the text entry component 604 can include an input designated for verbal/spoken characters, wherein the user holds down or presses the designated input and speaks the character (e.g., question mark). It is to be appreciated that this is but one example illustrated for brevity and clarity of explanation; however, a plurality of equivalent embodiments will be readily identifiable to those skilled in the art. For example, the text entry component 604 and audio capture component 608 can be any plurality of suitable input devices, and there may be a plurality of other observations created from other sensory devices working in concert to improve the accuracy of text entry.

As mentioned previously, FIG. 7 illustrates an example speech entry sequence 702 and text entry sequence 704 in accordance with an aspect of the current innovation. In addition the features described above, FIG. 7 also illustrates the manner in which users will naturally adjust their speaking cadence 702 to the speed at which they can enter text via a text entry component. Moreover, speech recognition systems can often have difficulty detecting phoneme or word boundaries, whereas typed text has a clear indicator, such as a space bar, punctuation, etc. Therefore, the current innovation can use text entry 704 to demarcate audio observations.

Figure 8:
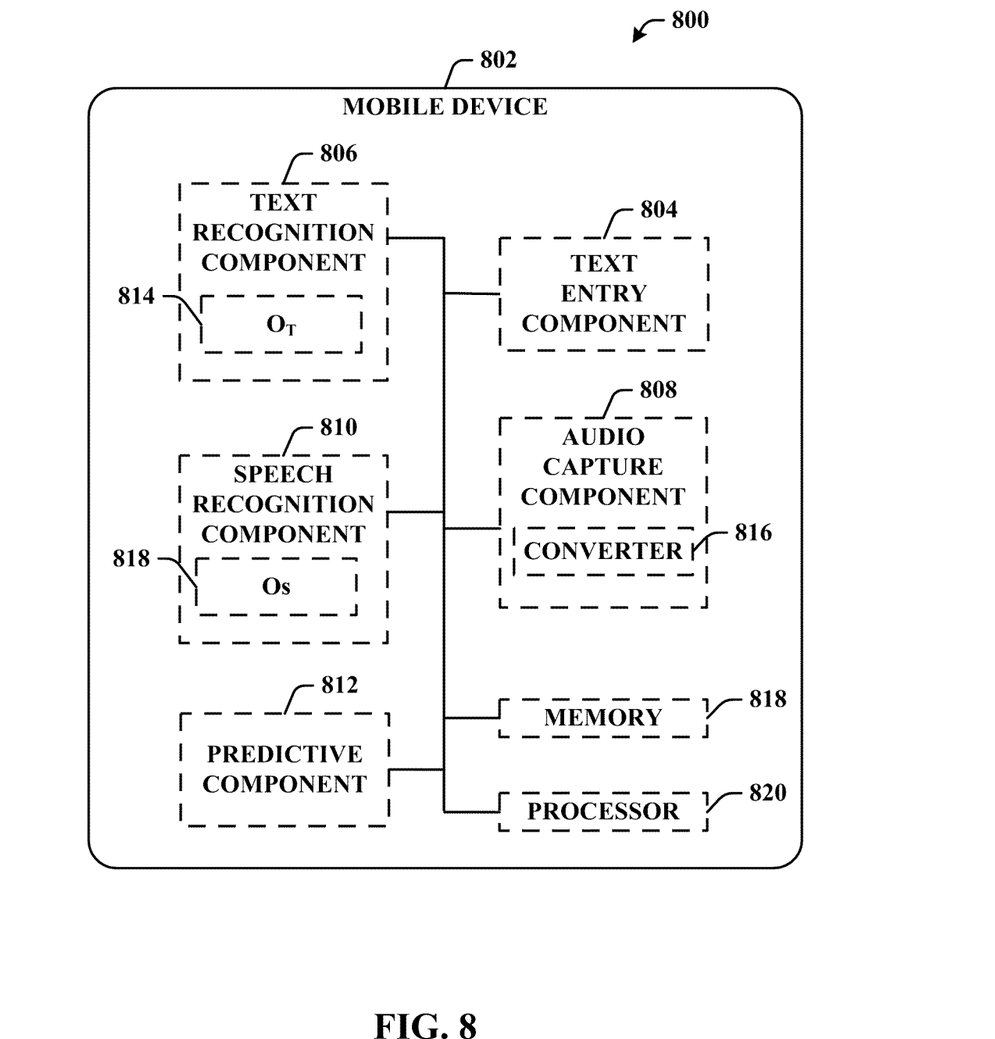
FIG. 8 illustrates an example system for combining speech and touch inputs for observation symbol mappings in accordance with the subject specification.

Referring to FIG. 8, an example system for combining speech and touch inputs for observation symbol mappings is illustrated in accordance with an embodiment of the subject innovation. As discussed previously, the system includes a text entry component 804 that enables a user to enter text via a touch screen, a keypad, and so forth. In addition, the user can almost contemporaneously speak the desired text message into the audio capture component 808. A text recognition component 806 and speech recognition component 810 can provide a set of statistical, probabilistic observations from which the mobile device 802 attempts to determine text that the user is attempting to enter. A predictive component 812 combines the observations of the text recognition component 806 and speech recognition component 810 in order to increase the accuracy of the determination, for example using a Hidden-Markov model that provides a statistical mapping of the observations to a specific state (e.g., words, component of words, characters, etc.).

The system 800 can additionally comprise memory 818 that is operatively coupled to the text entry component 804, text recognition component 806, audio capture component 808, speech recognition component 810, and predicative component 812 that stores information related to text entry and recognition, speech entry and recognition, predictive algorithms, and any other suitable information related to the mobile device 802. A processor 820 can be operatively connected to the text entry component 804, text recognition component 806, audio capture component 808, speech recognition component 810, and predictive component 812 (and/or memory 818) to facilitate combining speech and touch inputs for observation symbol mappings and the like. It is to be appreciated that processor 820 can be a processor dedicated to combining speech and touch inputs for observation symbol mappings, a processor that controls one or more components of system 800, and/or a processor that both analyzes and generates information received by the mobile device 802 and controls one or more components of system.

Figure 9:
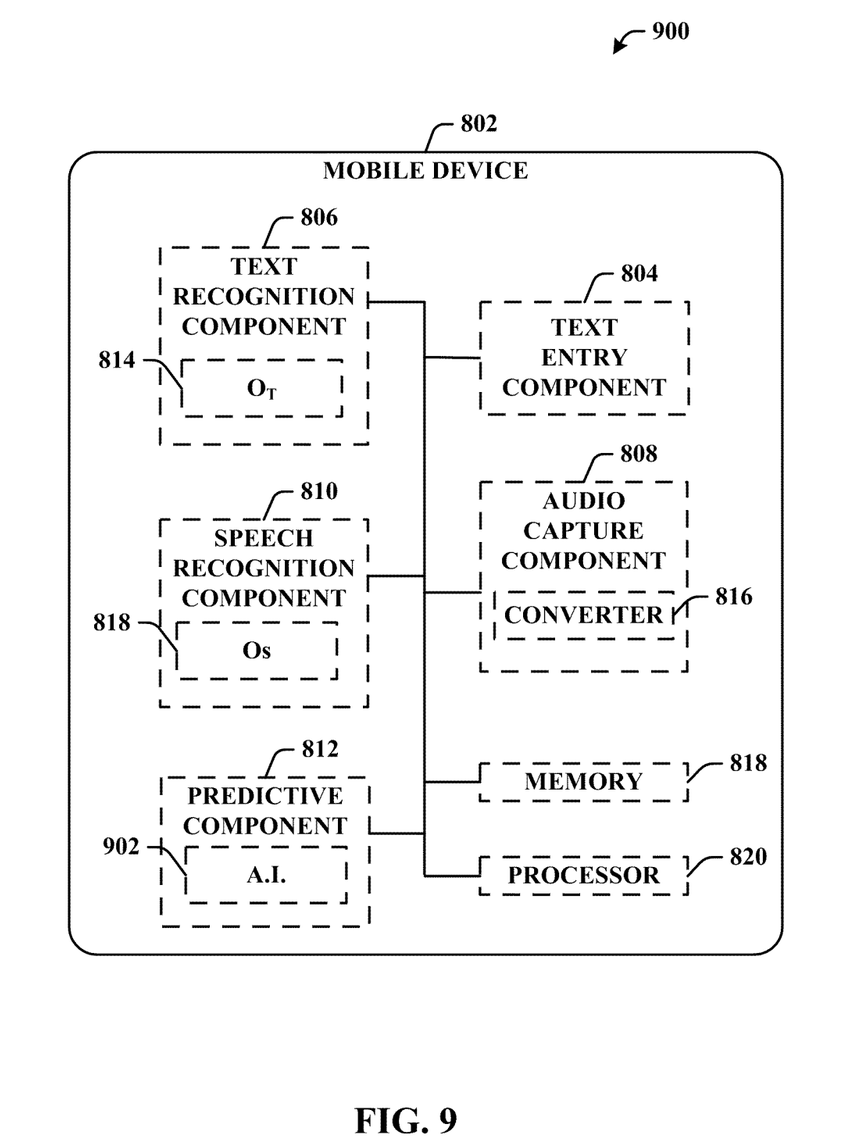
FIG. 9 illustrates a system that employs an artificial intelligence component which facilitates automating one or more features in accordance with the present specification.

FIG. 9 illustrates a system 900 that employs an artificial intelligence (AI) component 902 which facilitates automating one or more features in accordance with the subject innovation. The subject innovation (e.g., in connection with inferring) can employ various AI-based schemes for carrying out various aspects thereof. For example, a process for mapping the observation symbols to a specific state can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority. In addition, as mentioned previously, the A.I. component 902 can include a Hidden-Markov model, maximum likelihood Viterbi decoding algorithm, and so forth.

As will be readily appreciated from the subject specification, the subject innovation can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier (s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 10:
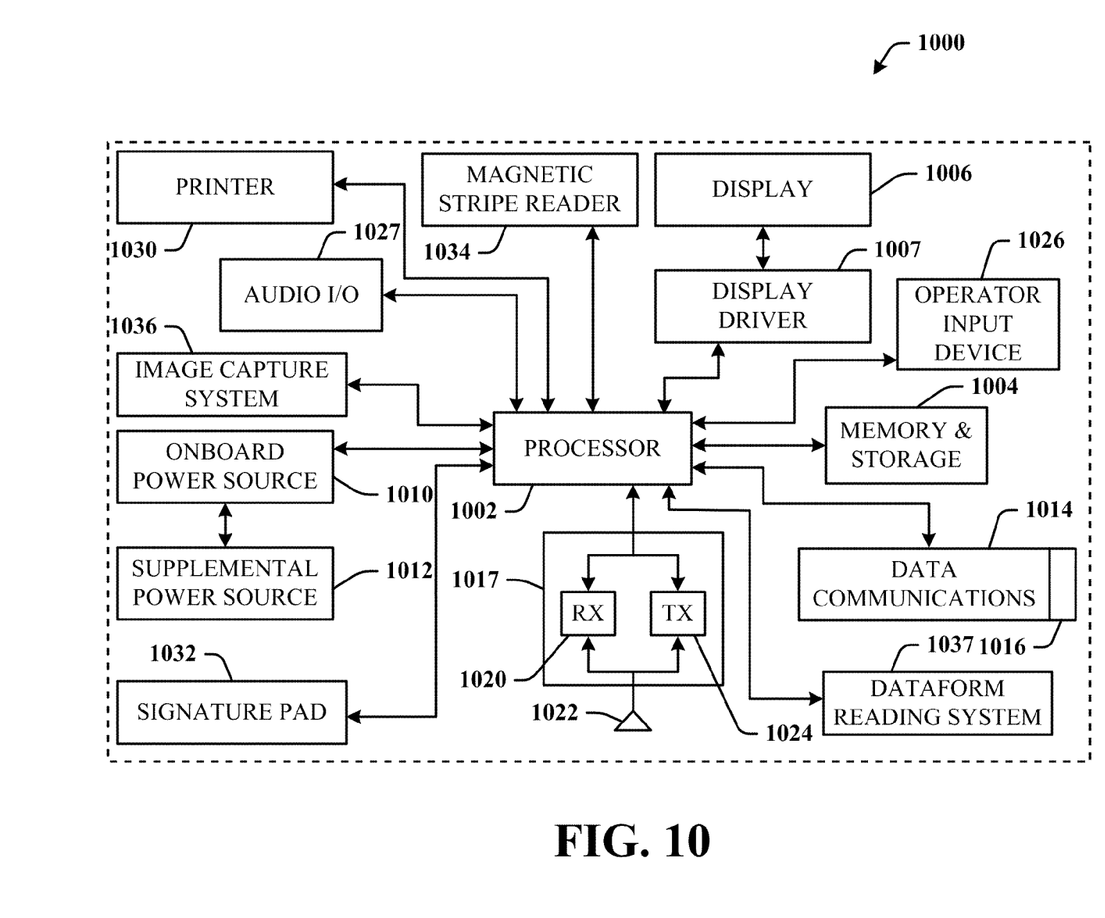
FIG. 10 illustrates an exemplary device operative to execute the one or more embodiments disclosed herein.

Referring now to FIG. 10, illustrated is a schematic block diagram of a portable hand-held terminal device 1000 according to one aspect of the invention, in which a processor 1002 is responsible for controlling the general operation of the device 1000. The processor 1002 is programmed to control and operate the various components within the device 1000 in order to carry out the various functions described herein. The processor 1002 can be one or more of any of a plurality of suitable processors. The manner in which the processor 1002 can be programmed to carry out the functions relating to the invention will be readily apparent to those having ordinary skill in the art based on the description provided herein.

A memory 1004 connected to the processor 1002 serves to store program code executed by the processor 1002, and serves as a storage means for storing information such as user credential and receipt transaction information and the like. The memory 1004 can be a nonvolatile memory suitably adapted to store at least a complete set of the information that is displayed. Thus, the memory 1004 can include a RAM or flash memory for high-speed access by the processor 1002 and/or a mass storage memory, e.g., a micro drive capable of storing gigabytes of data that comprises text, images, audio, and video content. According to one aspect, the memory 1004 has sufficient storage capacity to store multiple sets of information, and the processor 1002 could include a program for alternating or cycling between various sets of display information.

A display 1006 is coupled to the processor 1002 via a display driver system 1008. The display 1006 can be a color liquid crystal display (LCD), plasma display, or the like. In this example, the display 1006 is a ¼ VGA display with sixteen levels of gray scale. The display 1006 functions to present data, graphics, or other information content. For example, the display 1006 can display a set of customer information, which is displayed to the operator and can be transmitted over a system backbone (not shown). Additionally, the display 1006 can display a variety of functions that control the execution of the device 1000. The display 1006 is capable of displaying both alphanumeric and graphical characters.

Power is provided to the processor 1002 and other components forming the hand-held device 1000 by an onboard power system 1010 (e.g., a battery pack). In the event that the power system 1010 fails or becomes disconnected from the device 1000, a supplemental power source 1012 can be employed to provide power to the processor 1002 and to charge the onboard power system 1010. The processor 1002 of the device 1000 induces a sleep mode to reduce the current draw upon detection of an anticipated power failure.

The terminal 1000 includes a communication subsystem 1014 that includes a data communication port 1016, which is employed to interface the processor 1002 with a remote computer. The port 1016 can include at least one of Universal Serial Bus (USB) and IEEE 13104 serial communications capabilities. Other technologies can also be included, for example, infrared communication utilizing an infrared data port.

The device 1000 can also include a radio frequency (RF) transceiver section 1018 in operative communication with the processor 1002. The RF section 1018 includes an RF receiver 1020, which receives RF signals from a remote device via an antenna 1022 and demodulates the signal to obtain digital information modulated therein. The RF section 1018 also includes an RF transmitter 1024 for transmitting information to a remote device, for example, in response to manual user input via a user input device 1026 (e.g., a keypad) or automatically in response to the completion of a transaction or other predetermined and programmed criteria. The transceiver section 1018 facilitates communication with a transponder system, for example, either passive or active, that is in use with product or item RF tags. The processor 1002 signals (or pulses) the remote transponder system via the transceiver 1018, and detects the return signal in order to read the contents of the tag memory. In one implementation, the RF section 1018 further facilitates telephone communications using the device 1000. In furtherance thereof, an audio I/O section 1028 is provided as controlled by the processor 1002 to process voice input from a microphone (or similar audio input device) and audio output signals (from a speaker or similar audio output device).

In another implementation, the device 1000 can provide voice recognition capabilities such that when the device 1000 is used simply as a voice recorder, the processor 1002 can facilitate high-speed conversion of the voice signals into text content for local editing and review, and/or later download to a remote system, such as a computer word processor. Similarly, the converted voice signals can be used to control the device 1000 instead of using manual entry via the keypad 1026. For example, voice identification can be used to enable a switch from general mode to payment mode (or payment mode to general mode). It is to be appreciated that this is but one example, and a plurality of security measures, such as biometrics, can be used to enable a switch, including but not limited to fingerprint detection, facial recognition, iris recognition, and so forth.

Onboard peripheral devices, such as a printer 1030, signature pad 1032, and a magnetic strip reader 1034 can also be provided within the housing of the device 1000 or accommodated externally through one or more of the external port interfaces 1016.

The device 1000 can also include an image capture system 1036 such that the user can record images and/or short movies for storage by the device 1000 and presentation by the display 1006. Additionally, a dataform reading system 1038 is included for scanning dataforms. It is to be appreciated that these imaging systems (1036 and 1038) can be a single system capable of performing both functions.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for mobile device text entry, comprising:
   memory storing computer readable instructions configured for executing a plurality of components; and
   a processor, coupled to the memory and operable to execute the instructions, the plurality of components comprising:
   a text recognition component that obtains a set of inputs from a text entry component, determines a set of digitized coordinates for the set of inputs, and produces a first set of observations based on a set of possible intended user inputs and the digitized coordinates, wherein the text entry component is a touch screen display;
   a voice recognition component that obtains audio data from an audio capture component, and produces a second set of observations based on the audio data, wherein the audio capture component obtains the audio data concurrently as the text entry component obtains the set of inputs; and
   a predictive component that combines the first set of observations and the second set of observations into a concatenated observation sequence, and generates a textual output based on the concatenated observation sequence, wherein the generated textual output includes a first predetermined character that is predicted by the predictive component based on (a) a substitute character received by the text entry component, the substitute character is different from the first predetermined character, and (b) pronunciation of the first predetermined character received by the audio capture component.

2. The system of claim 1, wherein the touch screen display provides a virtual set of keys for a user to input a set of characters.

3. The system of claim 1, wherein the user triggers an input via the text entry component that enables a secondary input mode, wherein the secondary input mode includes speech recognition.

4. The system of claim 1 wherein the predictive component generates the textual output based on the sets in the concatenated observation sequence by employing at least one of a Hidden Markov model and a Viterbi decoder that processes the concatenated observation sequence.

5. The system of claim 1 wherein the first predetermined character is a special character.

6. A method for mobile device text entry, comprising:
   generating a first set of observations based on a set of possible intended user inputs and a determined set of digitized coordinates associated with the set of possible intended user inputs obtained via a text input device, wherein the text input device is a touch screen display;
   generating a second set of observations based on user inputs obtained via an audio input device, wherein user inputs via the text input device and the audio input device are obtained concurrently;
   combining the first set of observations and the second set of observations to produce a set of combined observations; and
   producing a textual output by processing the set of combined observations, wherein the produced textual output includes a first predetermined character that is predicted based on (a) a substitute character received by the text input device, the substitute character is different from the first predetermined character, and (b) pronunciation of the first predetermined character received by the audio input device.

7. The method of claim 6, wherein the touch screen display provides a graphical key wedge which enables users to select at least one character by touching the character on the display.

8. The method of claim 6, further comprising triggering an input that enables an alternative input mode.

9. The method of claim 8, wherein the alternative input mode includes speech recognition.

10. The method of claim 8, further comprising enabling the user to access inputs via the alternative input mode that are not currently available.

11. The method of claim 6 wherein the textual output is produced by processing the set of combined observations employing at least one of a Hidden Markov model and a Viterbi decoder.

12. The method of claim 6 wherein the first predetermined character is a special character.

13. A system for mobile device text entry, comprising:
   means for generating a first set of observations based on a set of possible intended user inputs and a determined set of digitized coordinates associated with the set of possible intended user inputs obtained via a touch screen display that provides a graphical key interface, wherein users select at least one unintended character by pressing at a location on the graphical key interface proximate to the location of the unintended character;

means for generating a second set of observations based on user inputs obtained via an audio capture device, wherein user inputs via the touch screen display and the audio capture device are obtained concurrently; and means for combining the first set of observations and the second set of observations to produce a set of concatenated observations; and means for producing a textual output based on the set of concatenated observations, wherein the produced textual output includes a first predetermined character that is predicted based on (a) a substitute character received by the graphical key interface, the substitute character is different from the first predetermined character, and (b) pronunciation of the first predetermined character received by the audio capture device.

14. The system of claim 13, further comprising means for triggering an input that enables an alternative input mode, wherein the alternative input mode provides the user with input options that are not presently available.

15. The system of claim 13 wherein the textual output is produced by using at least one of a Viterbi decoder and a Hidden-Markov Model.

16. The system of claim 13 wherein the first predetermined character is a special character.

* * * * *